United States Patent
Nicholson et al.

(10) Patent No.: US 6,825,483 B2
(45) Date of Patent: *Nov. 30, 2004

(54) CONTAINER FOR NUCLEAR FUEL TRANSPORTATION

(75) Inventors: Graham Nicholson, Preston (GB); Paul Giddins, Preston (GB)

(73) Assignee: British Nuclear Fuels PLC, Risley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/618,833

(22) Filed: Jul. 14, 2003

(65) Prior Publication Data

US 2004/0011971 A1 Jan. 22, 2004

Related U.S. Application Data

(63) Continuation of application No. 10/022,993, filed on Dec. 18, 2001, which is a continuation of application No. 09/829,677, filed on Apr. 10, 2001, now abandoned, which is a continuation of application No. 09/180,029, filed as application No. PCT/GB97/01197 on May 2, 1997, now abandoned.

(30) Foreign Application Priority Data

May 3, 1996 (GB) .............................. 9609304

(51) Int. Cl.[7] .............................. G21F 5/008
(52) U.S. Cl. .................... 250/507.1; 376/272
(58) Field of Search .................. 250/506.1, 507.1, 250/518.1; 376/272

(56) References Cited

U.S. PATENT DOCUMENTS

| 2,514,909 A | 7/1950 | Strickland |
| 3,038,999 A | 6/1962 | Loos et al. |
| 3,046,403 A | 7/1962 | Montgomery |

(List continued on next page.)

FOREIGN PATENT DOCUMENTS

| BE | 902 639 | 12/1985 |
| DE | 2300620 | 7/1974 |
| EP | 0 635 848 A1 | 6/1994 |
| GB | 1 243 486 | 8/1971 |
| GB | 2 091 477 A | 12/1981 |
| GB | 2 132 814 A | 12/1981 |
| GB | 2 233 595 A | 1/1991 |
| GB | 2 203 377 A | 10/1998 |
| JP | 62-249100 | 10/1987 |
| JP | 62 249 100 | 10/1987 |
| JP | 01-119799 | 5/1989 |
| JP | 07-120589 | 5/1995 |
| WO | WO 80/02469 | 11/1980 |
| WO | WO 94/01871 | 1/1994 |

OTHER PUBLICATIONS

Abstract of Japanese Patent Application No. 07 120 589 filed May 12, 1995.
Abstract of Japanese Patent Application No. 02 002 995 filed Jan. 8, 1990.
BUJ Packaging Design, by British Nuclear Fuels PLC, Published 1990.
E. E. Lewallen, "Celotex"—Insulated Shipping Containers, PATRAM, Aug. 16–20, 1971, pp. 130–144.
A. B. Thomas et al., Design of a New Air–Transportable Plutonium Container, PATRAM, Jun. 11–16, 1989, pp. 1245–1253.
A. J. Mallett et al., New End–Loading Shipping Container for Unirradiated Fuel Assemblies, PATRAM, Oct. 14–18, 1968, pp. 426–437.

Primary Examiner—Jack I. Berman
(74) Attorney, Agent, or Firm—Workman Nydegger (57) ABSTRACT

A transport container for nuclear fuel is provided with an outer container having internal insulation, the insulation defining an internal cavity. The cavity receives a plurality of fuel containers wherein the internal volume of the fuel containers is at least 5% of the external volume of the outer container. The container allows substantially higher volume proportions of enriched fuel to be safely transported than is possible with prior containers.

23 Claims, 7 Drawing Sheets

U.S. PATENT DOCUMENTS

| | | |
|---|---|---|
| 3,111,586 A | 11/1963 | Rogers |
| 3,119,933 A | 1/1964 | Allen |
| 3,175,087 A | 3/1965 | Aupetit et al. |
| 3,229,096 A | 1/1966 | Bonilla et al. |
| 3,466,445 A | 9/1969 | Schlies |
| 3,505,525 A | 4/1970 | Sandore |
| 3,787,699 A | 1/1974 | Menachem et al. |
| 3,832,563 A | 8/1974 | Dubovsky et al. |
| 3,845,315 A | 10/1974 | Blum |
| 3,882,313 A | 5/1975 | Siemens et al. |
| 3,886,368 A | 5/1975 | Rollins et al. |
| 3,935,467 A | 1/1976 | Gablin |
| 4,021,676 A | 5/1977 | Duffy |
| 4,219,735 A | 8/1980 | Blum |
| 4,274,922 A | 6/1981 | Rouse et al. |
| 4,288,699 A | 9/1981 | van der Vlis et al. |
| 4,356,062 A | 10/1982 | Bosshard |
| 4,357,541 A | 11/1982 | Ernst |
| 4,388,268 A | 6/1983 | Knackstedt et al. |
| 4,399,366 A | 8/1983 | Bucholz |
| 4,414,475 A | 11/1983 | Kratz et al. |
| 4,436,693 A | 3/1984 | Zezza et al. |
| 4,447,729 A | 5/1984 | Doroszlai et al. |
| RE31,661 E | 9/1984 | Mollon |
| 4,476,384 A | 10/1984 | Westphal |
| 4,476,394 A | 10/1984 | Muller et al. |
| 4,513,205 A | 4/1985 | Splinter |
| 4,535,250 A | 8/1985 | Fields |
| 4,543,488 A | 9/1985 | Diem |
| 4,588,088 A | 5/1986 | Allen |
| 4,619,808 A | 10/1986 | Formanek |
| 4,626,402 A | 12/1986 | Baatz et al. |
| 4,636,351 A | 1/1987 | Rohr |
| 4,649,017 A | 3/1987 | Couture |
| 4,649,018 A | 3/1987 | Waltersdorf et al. |
| 4,666,659 A | 5/1987 | Lusk et al. |
| 4,680,159 A | 7/1987 | Lahr et al. |
| 4,698,510 A | 10/1987 | Handke et al. |
| 4,711,758 A | 12/1987 | Machado et al. |
| 4,713,199 A | 12/1987 | Spilker et al. |
| 4,752,437 A | 6/1988 | Ito et al. |
| 4,770,844 A | 9/1988 | Davis, Jr. |
| 4,778,628 A | 10/1988 | Saha et al. |
| 4,780,269 A | 10/1988 | Fischer et al. |
| 4,781,883 A | 11/1988 | Daugherty et al. |
| 4,783,309 A | 11/1988 | Popp et al. |
| 4,784,802 A | 11/1988 | Mallary et al. |
| 4,815,624 A | 3/1989 | Houghton |
| 4,827,139 A | 5/1989 | Wells |
| 4,834,916 A | 5/1989 | Chaudon et al. |
| 4,834,917 A | 5/1989 | Ramm et al. |
| 4,836,975 A | 6/1989 | Guldner et al. |
| 4,844,840 A | 7/1989 | Feizollahi |
| 4,845,372 A | 7/1989 | Mallory et al. |
| 4,863,638 A | 9/1989 | Harper, III |
| 4,866,286 A | 9/1989 | Baatz et al. |
| 4,877,969 A | 10/1989 | James et al. |
| 4,896,046 A | 1/1990 | Efferding |
| 4,908,515 A | 3/1990 | McLeod |
| 4,914,306 A | 4/1990 | Dufrane et al. |
| 4,930,650 A | 6/1990 | Wells |
| 4,972,087 A | 11/1990 | Neider et al. |
| 4,996,019 A | 2/1991 | Catalayoud et al. |
| 5,035,342 A | 7/1991 | Houghton |
| 5,063,299 A | 11/1991 | Efferding |
| 5,098,645 A | 3/1992 | Fosberg |
| 5,114,666 A | 5/1992 | Ellingson et al. |
| 5,125,532 A | 6/1992 | Casagrande |
| 5,171,483 A | 12/1992 | Tollison, Jr. |
| 5,373,540 A | 12/1994 | DeCooman, Sr. et al. |
| 5,395,007 A | 3/1995 | Householder et al. |
| 5,406,601 A | 4/1995 | Hinderer et al. |
| 5,438,597 A | 8/1995 | Lehnert et al. |
| 5,595,319 A | 1/1997 | Householder et al. |
| 5,612,543 A | 3/1997 | Wenner et al. |
| 6,166,391 A * | 12/2000 | Strine et al. ............. 250/507.1 |

\* cited by examiner

CONTAINER FOR NUCLEAR FUEL TRANSPORTATION

CROSS-REFERENCE TO RELATED APPLICATIONS

This application is a continuation of U.S. patent application Ser. No. 10/022,993, filed Dec. 18, 2001, which is a continuation of U.S. patent application Ser. No. 09/829,677, filed Apr. 10, 2001, now abandoned, which is a continuation of U.S. patent application Ser. No. 09/180,029, filed May 7, 1999, now abandoned, which is a U.S. nationalization of International Application No. PCT/GB97/01197, filed May 2, 1997, which claims priority to Great Britain Application No. 9609304.2, filed May 3, 1996, which applications are hereby incorporated by reference.

BACKGROUND OF THE INVENTION

1. The Field of the Invention

This invention concerns improvements in and relating to fuel transportation, particularly but not exclusively relating to enriched nuclear fuels.

2. The Relevant Technology

Nuclear fuels, such as enriched uranium or mixed oxide forms, frequently need to be transported between sites, for instance the enrichment site and the fuel rod production site. The fuel is normally in the form of pellets or powder at this stage. International standards apply, requiring certain levels of thermal insulation and structural strength. A major concern is criticality control. The mass of enriched fuel within the transport container must be strictly limited to ensure that a criticality event does not occur. This single requirement places a stringent limit on the volume of fuel which can be transported in any given volume of a transport container. In this regard, the transportation of nuclear fuel differs significantly from transportation of other radioactive materials. Radioactive waste is of a far lower enrichment, thus facilitating transport of greater volumes in proximity with one another. In assembled fuel rods on the other hand, the volume of fuel when compared with the overall fuel rod and supporting structure volume is very low.

SUMMARY OF THE INVENTION

Present systems usually consist of a cylindrical drum provided with one or more layers of wood on all sides, the wood defining a central recess into which a single cylinder containing the enriched fuel is placed.

The fuel containing volume of the inner drum is very low compared with the volume of the outer drum. As a consequence the transportation of fuel takes up a considerable amount of space. The commercial considerations of this apply as they do to any transportation procedure. Additionally the cylindrical nature of the unit presents handling and stability problems.

According to a first aspect of the invention we provide a transportable container for nuclear fuel, the container comprising an outer container provided with internal insulation, the insulation defining an internal cavity, the cavity receiving a plurality of fuel containers, wherein the internal volume of the fuel containers is at least 5% of the external volume of the outer container.

A container having this level of fuel volume to overall volume has not previously been achieved. The present invention also allows this level to be reached whilst meeting the necessary criticality, insulation and other standards.

Preferably the internal volume of the fuel container is at least 10% of that of the external volume of the outer container. A level of at least 15%, 20% or 25% is preferred. Levels of at least 30%, 35% or even 40% may be reached. Any increase in fuel volume to overall container volume is significant in reducing transportation costs and the capital costs involved in providing the strong fuel containers.

Preferably the outer container is formed with a steel and most preferably stainless steel skin. The corners and/or edges of the outer container may be provided with strengthening elements. These may take the form of L-shaped sections. The outer container is preferably provided with feet.

The outer container is preferably provided with a lid. The lid is preferably releasably fastened to the outer container. Clamps attached to the outer container and releasably engageable with the periphery of the lid are preferred. The clamps may also be releasably engaged with the outer container. The lid may be provided with handles or other forms of engagement for removal of the lid.

It is particularly preferred that the lid be received within the perimeter of two or more projections from the outer container. The strengthening elements projecting above the top of the container may define this perimeter.

Preferably the insulating material is provided in a series of discrete layers. One or more base layers and/or one or more wall layers for each wall may be provided. The lid insulation may be mounted on the metal lid or may be provided separately. If provided separately a pair of interlinking sections may be provided.

The insulating layer is preferably thermally insulating and/or neutron absorbing. Calcium silicate offers a preferred insulating material. One or more different materials may be used together or in a sandwich style structure.

Preferably the insulation layer defines the boundaries of a single internal cavity. A rectilinear cavity is preferred.

The internal cavity is preferably provided with a correspondingly shaped single unit internal container comprising four side walls and a base. The internal container is preferably made of steel, boronated steel, or most particularly stainless steel.

In one form the internal container is preferably divided up into a series of chambers. The chambers may be defined by one or more elements crossing the internal cavity or container. Preferably the elements are plates spanning the full height, or at least substantially the full height, of the internal volume. Preferably one or more elements span the internal volume in different directions, most preferably at substantially 90 degrees to one another. Preferably the plates are substantially vertically provided. It is particularly preferred that two plates cross the internal cavity in each of two directions at 90 degrees to one another. Preferably the internal volume is divided up into nine substantially equivalent chambers.

In a second alternative form, the internal cavity may be fitted with elements such as plates spanning the full height of the internal volume to define an internal container. The chambers again being defined by one or more elements crossing the internal cavity. A base plate may be provided on the base insulating layer to define a base for the internal volume. A top plate may also be provided. Side plates may also be provided to define the sides of the chambers.

One or more of the base, top or dividing elements or plates may be formed of metal. Steel and in particular stainless steel or boronated steel.

The base, side and dividing plates or elements of the single unit internal container is alternatively provided as a separate unit to the insulating layers and outer container.

In a further alternative form the internal cavity may be fitted with a plurality of sleeve elements. Preferably the sleeve elements are adapted to receive fuel containers or pails. The sleeves may be continuous or substantially continuous. Preferably the sleeves are of circular cross-section. Preferably the sleeves internal diameter is substantially equivalent to the external diameter of the fuel containers or pails. Preferably the sleeves are rigidly separated from one another. The sleeves may be rigidly separated by mounting on a base plate.

Preferably the sleeves are discrete from one another around their entire periphery. Four or more, and preferably 8 or 9 such sleeves may be provided within the internal cavity.

The base plate may be attached to one or more side plates or elements. The side plates or elements may form walls corresponding to the walls of the internal cavity. An internal container may thus be provided.

Preferably one or more of the sleeves are at least in part surrounded by a neutron absorbing material. Preferably one or more of the sleeves, and most preferably all of the sleeves, are surrounded by a neutron absorbing material around their entire circumference. A neutron absorbing material may optionally be provided around one or both ends of one or more of the sleeves.

Preferably the neutron absorbing material is a resin based material. Preferably the neutron absorbing material is fire resistant. Preferably the resin based material is loaded with, up to 6.5% boron, or up to 5% boron, and more preferably up to 2.5% boron. Preferably the resin occupies at least 50% of the non-sleeve volume of the internal cavity. The neutron absorbing material may fill the entire non-sleeve volume of the internal cavity or lower density materials may be incorporated, such as polystyrene.

The internal container is preferably provided with a lid.

Preferably the fuel containers or pails comprise cylindrical drums. Preferably releasable lids are provided. The release mechanism for the lid is preferably contained within the plan profile of the container in the sealed position to minimize space.

The fuel preferably occupies at least 50% of the fuel container and may occupy 60, 70, 80, 90, 95% or any individual % value over 50%.

The fuel may be provided within the fuel containers in plastic bags, such as polyethylene.

The fuel may be in pellet, powder or other form. Unirradiated enriched uranium may be the fuel. The provision of uranium at substantially up to 5% enrichment may be used. A density of around 1.4 g/cm$^3$ may be used. In such a case each individual fuel container may have a volume of between 15 and 20 liters, for instance 17.3 liters.

The boron content of any one of the insulator layers, internal divisions, sleeves, fuel containers, or remaining chamber space may be increased to give increased absorption.

Fuel containers are preferably provided in more than three of the chambers or sleeves. The provision of the fuel containers in peripheral chambers or sleeves and most preferably all the peripheral chambers or sleeves is envisaged. One or more of the chambers or sleeves may be provided with a neutron absorber. Preferably the neutron absorber is provided in a unit corresponding in dimensions to the chamber or sleeve receiving it. The provision of polyethylene as the neutron absorber is preferred. The polyethylene absorber may be in a steel container corresponding to the size and shape of the chamber or sleeve receiving it. The absorber may also be provided with a lid corresponding with the chamber or sleeve into which the absorber is placed in order to assist in retaining the absorber within the chamber or sleeve. The lid is preferably of steel.

In a particularly preferred form the container comprises an outer container with a removable lid, the outer container being provided with an insulating layer on each wall and base, a further removable insulating layer being provided between the lid and the internal cavity of the container in use, the internal cavity being divided into a plurality of chambers, a fuel container being provided in at least three of the chambers and at least one of the chambers being provided with a neutron absorbing material.

In an alternative particularly preferred form the container comprises an outer container with removable lid, the outer container being provided with an insulating layer on each wall and the base, a further removable insulating layer being provided on the lid, the insulating layers defining an internal cavity of the container, the internal cavity being provided with a plurality of sleeves, a fuel container being provided in at least 3 of the sleeves and the sleeves being at least partially surrounded by a neutron absorbing material.

It is preferred that only one fuel container or pail be provided in each chamber.

A particularly preferred arrangement provides a rectangular plan aperture divided into nine chambers, three chambers by three chambers. Preferably the fuel containers are provided in the peripheral chambers. A neutron absorbing material may be substituted in the central chamber and/or one or more of the other chambers as required.

In a further particularly preferred arrangement a rectilinear plan internal cavity may be provided with nine sleeve elements, in a three by three sleeve element arrangement. Preferably fuel containers are provided in all the periphery sleeves and most preferably in all of the sleeves. A neutron absorbing material may be substituted in one or more of the chambers.

BRIEF DESCRIPTION OF THE DRAWINGS

Various embodiments of the invention will now be illustrated, by way of example only, and with reference to the accompanying drawings in which.

DETAILED DESCRIPTION OF THE PREFERRED EMBODIMENTS

Figure 1:
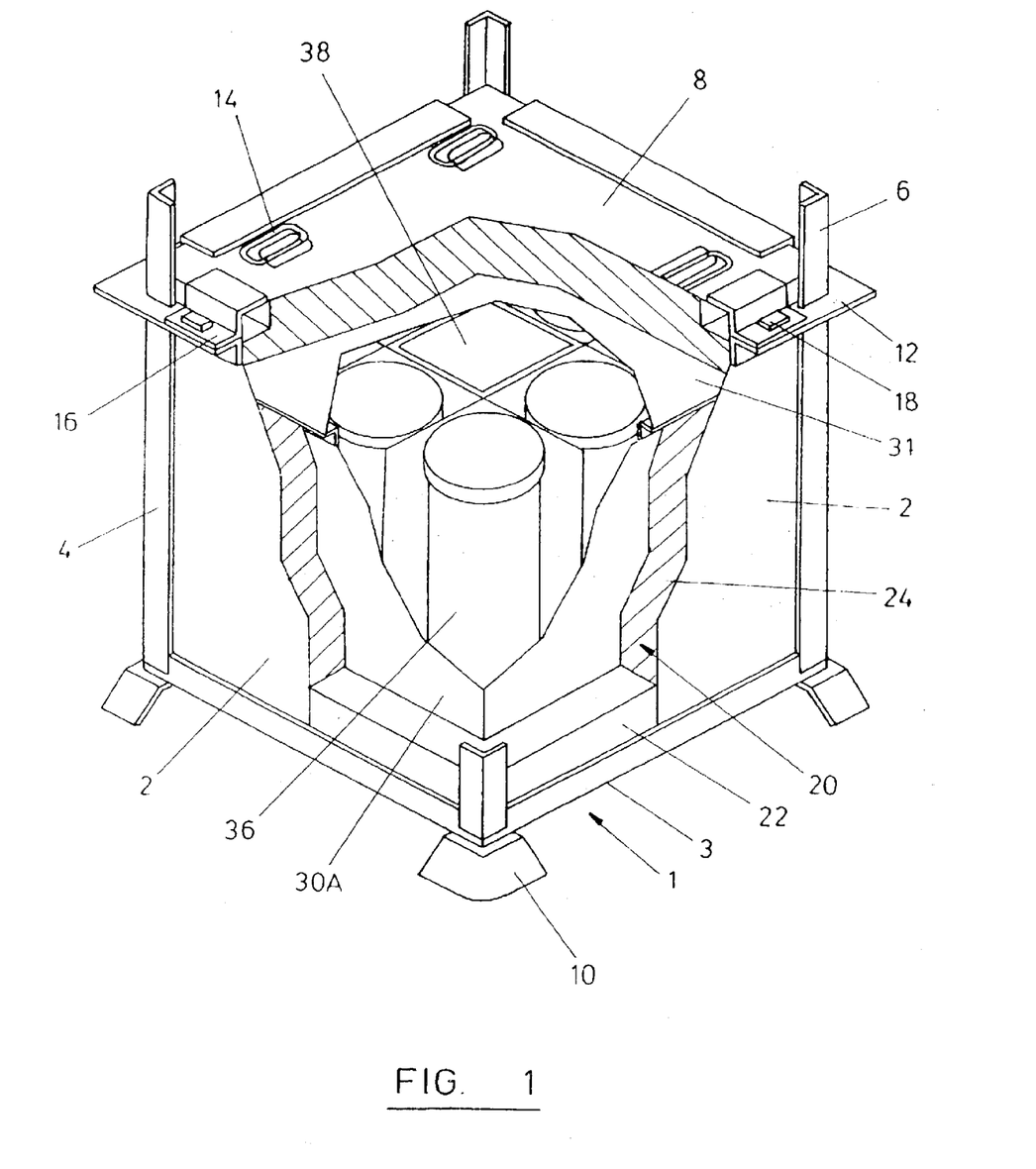
FIG. 1 shows a perspective view of a container according to a first embodiment of the invention cut away to show the fuel containers in the container.

The container as illustrated in FIG. 1 has the general form of a rectangular box. The container 1 is defined by four vertically arranged walls 2 and a base wall 3. The walls are provided at the corner joins with strengthening elements 4 in the form of L-shaped strips. The vertical strengthening elements 4 have portions 6 which extend beyond the lid 8 of the container. Feet 10 are provided on each corner of the base and engage with the portion 6 for easy and stable stacking.

The outer skin forming the walls 2, base 3 and separate lid 8 are made of stainless steel.

A peripheral flange 12 is provided around the container. The lid 8 is dimensioned to be slidably received within the boundaries of the L-shaped elements 4. The lid 8 has a flange 16 which corresponds with the peripheral flange 12 of the container. Handles 14 on the lid aid in its removal and insertion.

In the closed and retained position shown the lid 8 is retained by a series of quick release nuts and bolts 18 which engage corresponding openings in the flange 16 of the lid 8. The lid is provided with suitable seals to prevent any ingress of water.

Figure 2:
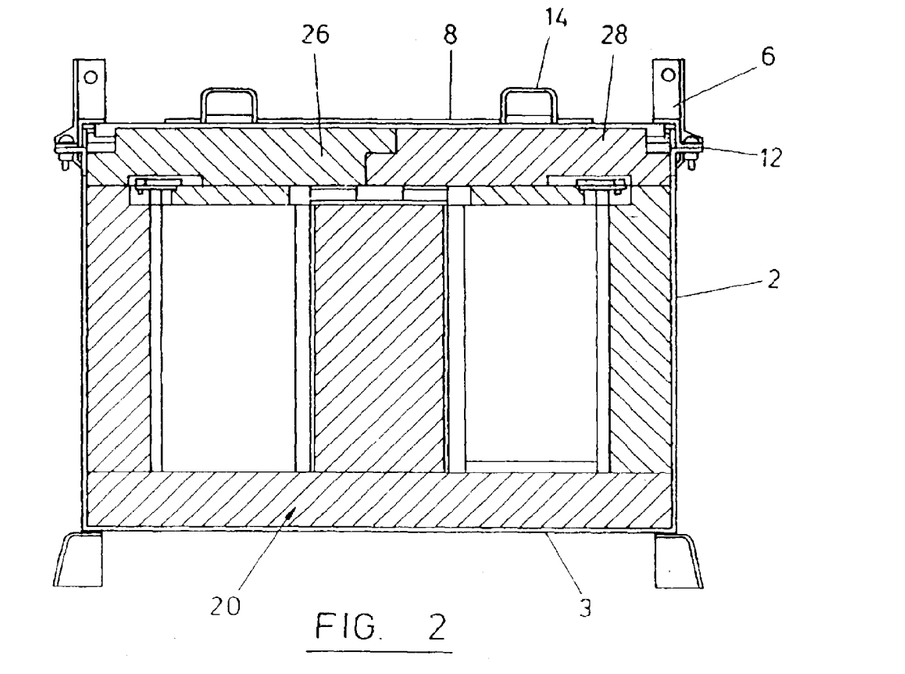
FIG. 2 shows a cross-sectional side view of FIG. 1.

Next to the steel skin the container is provided with a substantial thickness of a thermal insulator 20 formed from calcium silicate. This layer is provided in a series of sections, see FIG. 2. The materials provision in solid sections ensures accurate positioning during assembly and use. A single base layer of insulator 22 and four wall sections 24 line the container itself. When the container is loaded, as described below, a two piece insulating top layer is applied. These two pieces 26, 28 are shaped to interconnect with one another.

Figure 3:
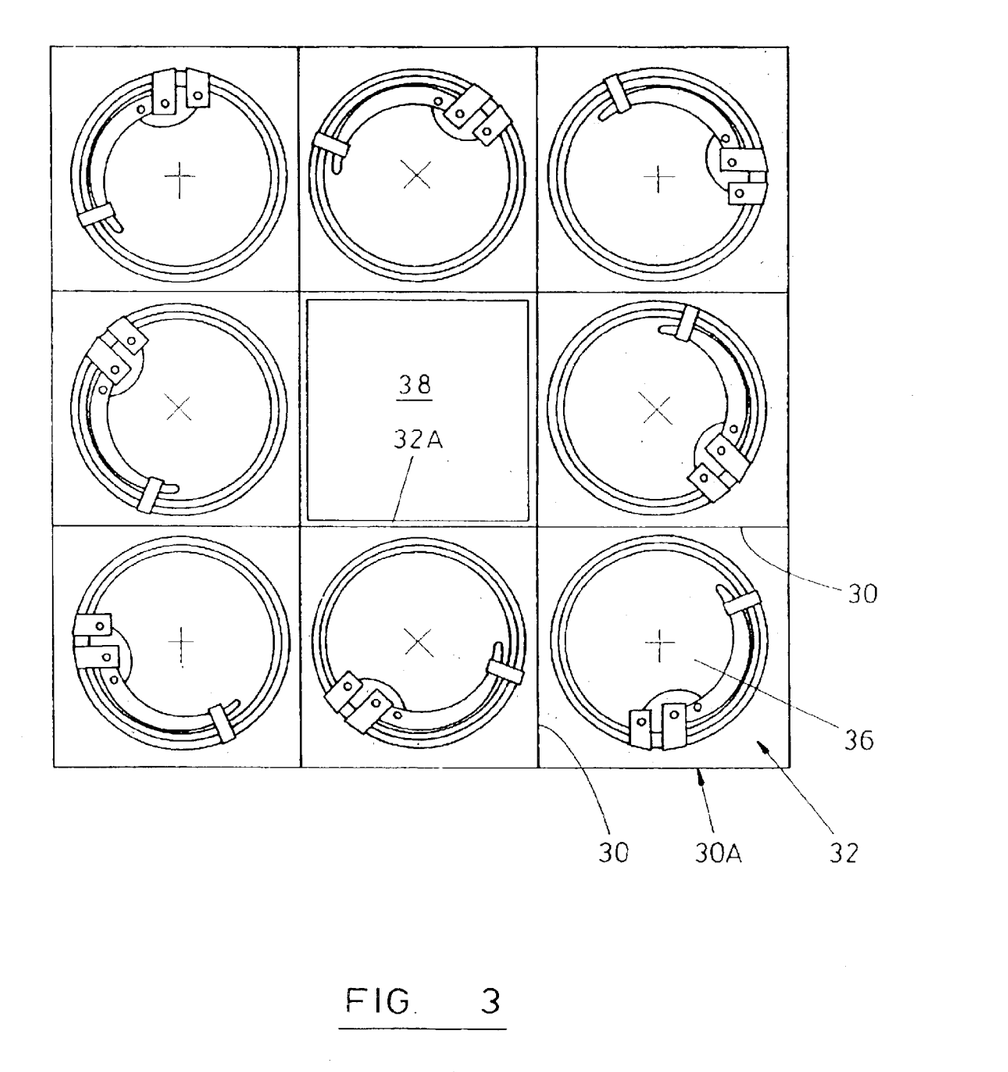
FIG. 3 shows a pail load in plan view.
Figure 4:
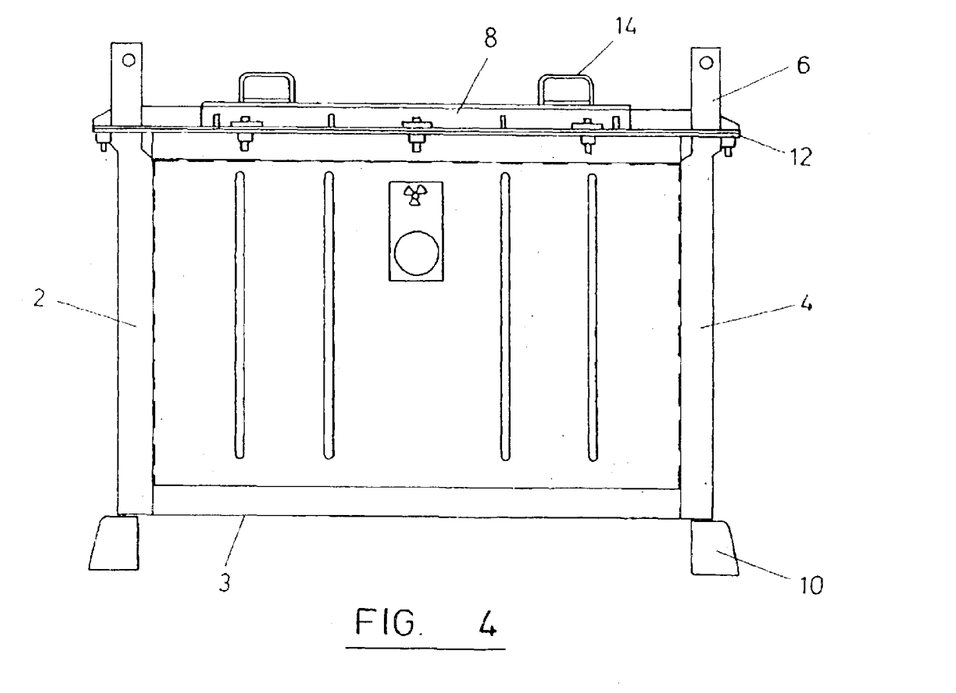
FIG. 4 shows a side view of the container of FIG. 1.
Figure 5:
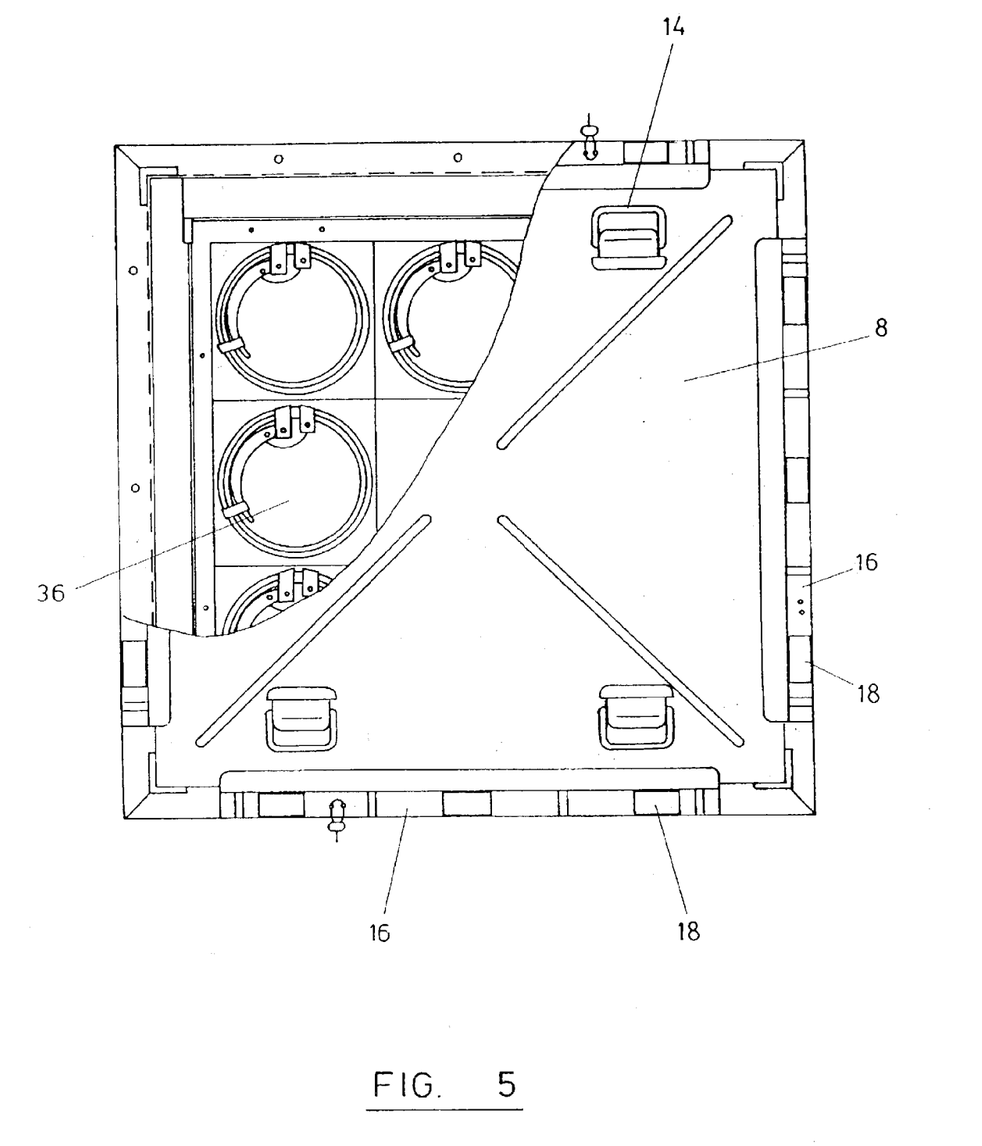
FIG. 5 shows a plan view of a closed container according to the first embodiment of the invention partly cut away to show the fuel containers in the container of the invention.

The rectangular box defined by the interior surfaces of the insulating layers receives an internal container 30A having four walls and a base and also made of boronated steel or stainless steel. This container 30A is also provided with a lid 31 as shown in FIG. 1. As seen in FIG. 3 the container consists of a series of interlocking vertical walls 30 made of boronated steel/stainless steel. The container 30A has two pairs of internal walls 30 at 90 degrees to one another defining nine chambers 32 within the pail load.

In use within each of the eight peripheral chambers a fuel drum or pail 36 is received. The central chamber 32A is provided with a polyethylene neutron absorber 38. The absorber 38 is itself provided in a steel container (not shown) which corresponds with the shape of the chamber 32 into which it is to be fitted. A lid is provided on the top of the absorber to retain the absorber in place in the chamber 32A.

Once the internal container 30A has received all eight fuel drums 36, and the container 1 is sealed by applying the lid 31, the insulating top layer 26, 28, and the external lid 8. The lid 8 is secured to the container 1 by the quick release nuts and bolts 18.

Figures 6, 6A:
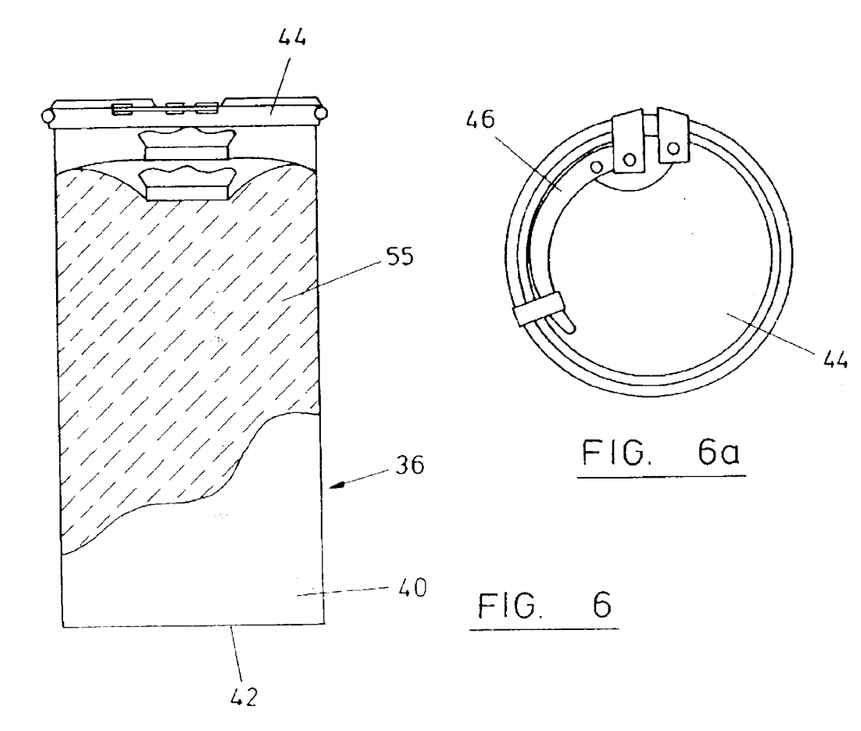
FIG. 6 shows one embodiment of a fuel container or pail for use in the prevention inventions outer container.
FIG. 6A shows a plan view of a fuel container or pail of FIG. 6.

The fuel containing drum 36, as illustrated in FIG. 6, consists of a stainless steel cylinder wall 40 with a base plate 42 and releasable lid 44. The lid 44 is provided with a standard internal lever clamp band 46 which enables the lid to be secured to the fuel drum 36. The provision of the internal lever clamp band 46 within the outline of the drum 36 is important to minimize the space taken up. In the closed state the drum 36 is water tight avoiding any water ingress.

The fuel 55 in either powder of pellet form is contained within polyethylene bags. The polyethylene bags filled with fuel are placed in a larger polyethylene bag which is placed in the drum. Once the larger bag is full this is then closed. The drum is then sealed with the lid 44. The fuel may typically be enriched uranium destined to form fuel rods.

Figure 7:
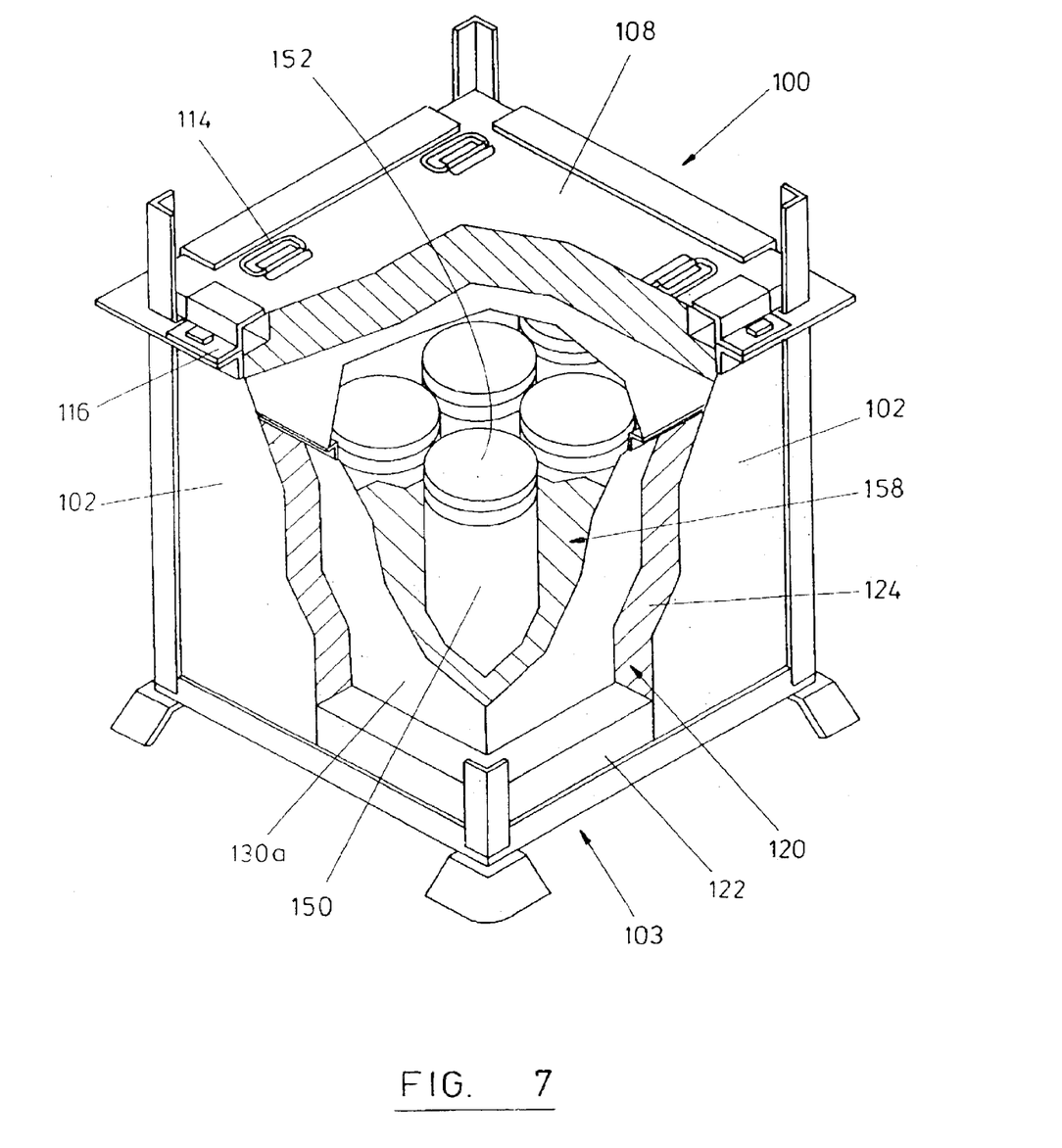
FIG. 7 shows a perspective view of the container according to a second embodiment of the invention, cut away to show the fuel containers in the container.

In the second embodiment of the invention illustrated in FIG. 7 the container 100 is once again in the form of a rectangular box. The external container 100 is defined in a similar manner to the container of the first embodiment by vertically arranged side walls 102 and a base wall 103. Other equivalent elements are numbered with reference numerals corresponding to those used in the first embodiment increased by 100.

Thus the strengthening elements, feet, peripheral flange, lid fixing and lid alignment are provided in a similar manner.

The container 100 is also provided with substantial thickness of thermal insulator 120 provided by a base section, wall sections and a section optionally mounted on the lid in a similar manner to the first embodiment of the invention.

The arrangement within the internal cavity defined by these insulating layers differs, however.

The cavity is provided with a series of stainless steel sleeves 150 which are rigidly mounted on a bottom plate standing on the base layer insulation. The cylindrical sleeves are hollow and have an internal dimension configured to snugly correspond to the external dimensions of the fuel containers 152 shown inserted in the sleeves 150. Nine sleeves 150 are used in a three by three arrangement with a fuel container 152 being positioned in each in use.

The fuel containers are generally of the type illustrated in FIGS. 6 and 6A above, but include external fasteners projecting beyond the plan of the fuel containers.

Figure 8:
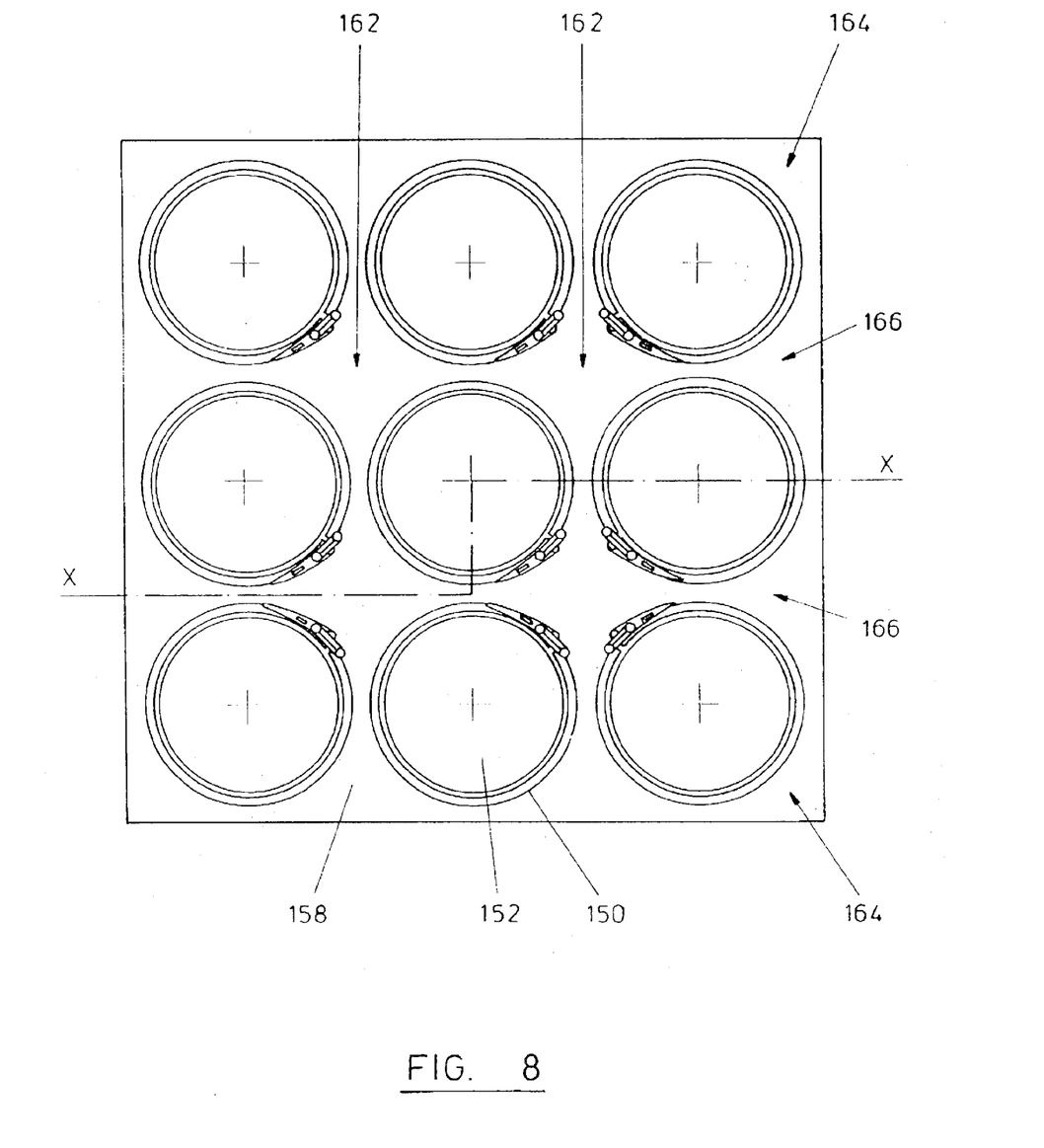
FIG. 8 shows a pail load in plan view.
Figure 9:
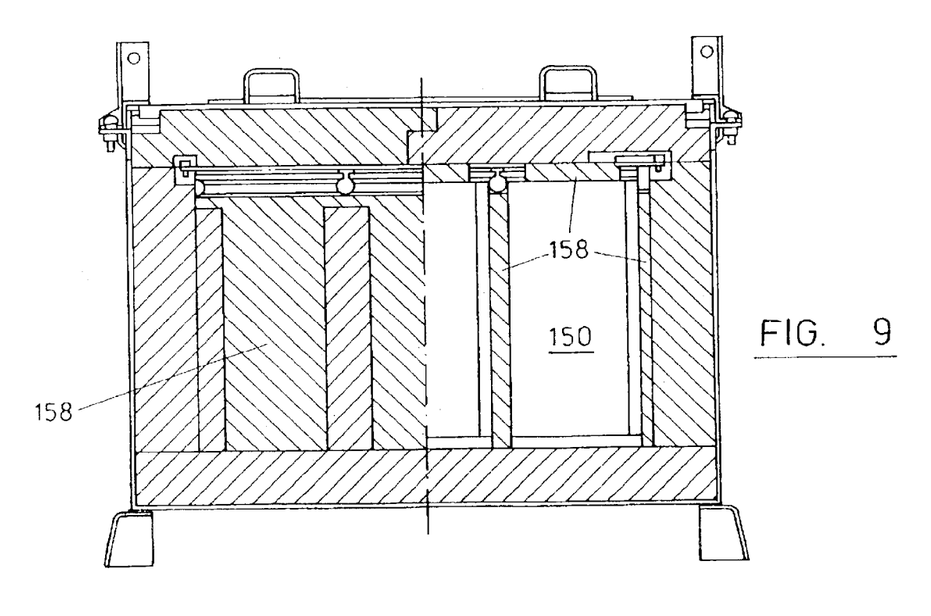
FIG. 9 shows a cross-sectional side view along axis XX of FIG. 8.

As shown in FIGS. 7, 8 and 9 the sleeves 150 are surrounded by a neutron absorbing material 158. This material is introduced to the volume surrounding the sleeves during the manufacture of the portion of the assembly filling the internal cavity by pouring in a liquid resin which is then allowed to harden. A resin tight unit is preferred as defining this cavity. The resin is loaded with boron preferably to a level of 2% to provide the desired neutron absorbing capability. A boron loading up to 6.5 wt % and/or a lead loading up to 15 wt % may be provided. The material offers between $1 \times 10^{22}$ and $1 \times 10^{23}$ hydrogen atoms/cm$^3$ To reduce the cost and weight of the neutron absorbing material, typically 1.68 g/cm$^3$ lighter materials such as polystyrene can be incorporated in portions where the neutron absorbing volume of material would otherwise be excessive. Thus at locations 162 between sets of 4 sleeves and externally at the corner locations 164 and locations 166 between the pairs of sleeves the neutron material may be replaced with the lighter material. This does not affect the neutron absorbing capability of the container.

The fuel containing drums 152 and the manner in which the fuel, as powder or pellets is provided within them is as described above for the first embodiment of the invention.

The present invention allows approximately 20%–40% of the outer container volume to be occupies by fuel 55 and yet still meets the necessary standards. This compares favorably with prior art systems. An increased payload is thus provided successfully.

The use of stainless steel and the modular nature of the assembly assists in refurbishment and any cleaning stages required such as decontamination.

What is claimed is:

1. A transportable container for nuclear fuel comprising:
   an outer container bounding an interior and defining an overall volume;
   a thermal insulation material disposed within the interior bounded by the outer container, the thermal insulation material bounding an internal cavity;
   four or more sleeves disposed within the cavity; and
   one or more fuel containers received within at least one of the sleeves, each of the one or more fuel containers having an internal volume and a releasable lid, the sum of the internal volumes of the one or more fuel containers being at least 5% of the overall volume of the outer container.

2. A container according to claim 1 in which the sleeves are surrounded by a neutron absorbing material, the neutron absorbing material filling the internal cavity apart from the inside of the sleeves.

3. A container according to claim 1 in which the volume of the internal cavity outside of the sleeves is filled by neutron absorbing material or neutron absorbing material which incorporates lower density materials.

4. A container according to claim 1 in which the sleeves are rigidly separated from one another.

5. A container according to claim 1 in which the outer container is comprised of steel, the sleeves are comprised of stainless steel and have a substantially circular transverse cross-section, the sleeves having an internal diameter that is substantially equal to an external diameter of the fuel containers, the sleeves being rigidly separated from one another, the sleeves being surrounded around their entire circumference by a neutron absorbing material, the fuel containers being comprised of stainless steel having a substantially cylindrical configuration, and nuclear fuel being disposed within the fuel containers in plastic bags.

6. A container according to claim 1 in which the outer container is provided with a lid.

7. A container according to claim 1 in which only one fuel container is provided in each sleeve.

8. A transportable container for nuclear fuel comprising:
    an outer container bounding an interior and defining an overall volume;
    a thermal insulation material disposed within the interior bounded by the outer container, the thermal insulation material comprising one or more base layers and one or more wall layers; and
    a plurality of chambers being provided within bounds defined by the thermal insulation material, one or more fuel containers being provided within each of a plurality of the chambers, the sum of the internal volumes of the fuel containers being at least 5% of the overall volume defined by the outer container.

9. A container according to claim 8 in which the chambers are surrounded by a neutron absorbing material, the neutron absorbing material filling the bounds defined by the insulation apart from the inside of the chambers.

10. A container according to claim 8 in which neutron absorbing material or neutron absorbing material which incorporates lower density materials fills the volume around the sleeves.

11. A container according to claim 8 in which the internal bounds of the thermal insulation material contact a neutron absorbing material.

12. A container according to claim 8 in which the internal insulation is neutron absorbing.

13. A container according to claim 12 in which the interior bounds of the neutron absorbing insulation contact a neutron absorbing material.

14. A container according to claim 12 in which the neutron absorbing material is loaded with boron.

15. A container according to claim 8 in which the outer container is comprised of steel, the sleeves are comprised of stainless steel and have a substantially circular transverse cross-section, the sleeves having an internal diameter that is substantially equal to an external diameter of the fuel containers, the sleeves being rigidly separated from one another, the sleeves being surrounded around their entire circumference by a neutron absorbing material, the fuel containers being comprised of stainless steel having a substantially cylindrical configuration, and nuclear fuel being disposed within the fuel containers in plastic bags.

16. A transportable container for nuclear fuel, the container comprising:
    an outer container, the outer container being provided with a thermal insulation material disposed therein;
    a plurality of laterally spaced apart sleeves provided within the outer container; and
    one or more fuel containers received within the one or more of the sleeves, the fuel containers each being provided with a releasable lid for the fuel container, the outer container being provided with a releasable lid for the outer container.

17. A container according to claim 16 in which the releasable lid for the fuel container seals the fuel container when fastened and the releasable lid for the outer container seals the outer container when fastened.

18. A container according to claim 16 in which the outer container and outer container lid provides a first barrier and the fuel container and fuel container lid provides a second barrier between the nuclear fuel and the exterior of the outer container.

19. A transportable container for nuclear fuel, the container comprising:
    an outer container defined by outer container walls, the outer container being provided with a thermal insulation material disposed therein;
    a plurality of laterally spaced apart sleeves provided within the outer container;
    nuclear fuel provided within the sleeves in use, wherein there is provided between the nuclear fuel within the sleeves and an outer container wall of the outer container at least some of the thermal insulation material and a neutron absorbing material.

20. A container according to claim 19 in which a material of lower density than the neutron absorbing material is also provided between a side wall of a sleeve and an outer container wall.

21. A container according to claim 19 in which the neutron absorbing material is fire resistant.

22. A transportable container for nuclear fuel, in which:
    the nuclear fuel is uranium oxide and the fuel is contained within a first container;
    one or more first containers are contained within a fuel container;
    each fuel container is received within a sleeve;
    the sleeves are laterally spaced apart from one another within a cavity;
    the cavity is provided with a thermal insulation material;
    the thermal insulation material is disposed within an outer container; and
    the outer container contains both the fuel containers and the first containers.

23. A container according to claim 22 in which the first container is a plastic bag.

* * * * *

UNITED STATES PATENT AND TRADEMARK OFFICE
CERTIFICATE OF CORRECTION

PATENT NO. : 6,825,483 B2
DATED : November 30, 2004
INVENTOR(S) : Graham Nicholson and Paul Giddins It is certified that error appears in the above-identified patent and that said Letters Patent is hereby corrected as shown below:

Column 2,
Line 66, after "internal container" change "is" to -- are --

Column 3,
Line 6, change "sleeves" to -- sleeves' --

Column 4,
Line 54, change "prevention inventions" to -- present invention's --

Column 5,
Line 2, after "corner" change "joins" to -- joints --
Line 48, before "the container 1" remove "and"
Line 60, after "powder" change "of" to -- or --
Line 63, after "full" change "this" to -- it --

Column 6,
Line 6, after "increased by" remove bold face font from "100."
Line 38, after "1.68 g/cm³" insert -- or --
Line 51, before "by fuel" change "occupies" to -- occupied --

Signed and Sealed this

Twelfth Day of July, 2005

JON W. DUDAS
*Director of the United States Patent and Trademark Office*